US011326017B2

(12) United States Patent
Unkelhäußer et al.

(10) Patent No.: US 11,326,017 B2
(45) Date of Patent: May 10, 2022

(54) TIN-FREE CATALYSIS OF SILANE-FUNCTIONAL POLYURETHANE CROSSLINKERS

(71) Applicant: Evonik Operations GmbH, Essen (DE)

(72) Inventors: Tobias Unkelhäußer, Lüdinghausen (DE); Emmanouil Spyrou, Schermbeck (DE); Stephanie Hösl, Dorsten (DE); Dennis Menne, Haltern am See (DE); Guido Streukens, Wuppertal (DE)

(73) Assignee: Evonik Operations GmbH, Essen (DE)

( * ) Notice: Subject to any disclaimer, the term of this patent is extended or adjusted under 35 U.S.C. 154(b) by 236 days.

(21) Appl. No.: 16/410,082

(22) Filed: May 13, 2019

(65) Prior Publication Data

US 2020/0079894 A1    Mar. 12, 2020

(30) Foreign Application Priority Data

Sep. 10, 2018    (EP) .................................... 18193333

(51) Int. Cl.
| | | |
|---|---|---|
| *C08G 18/18* | (2006.01) | |
| *C08K 3/013* | (2018.01) | |
| *C08G 18/28* | (2006.01) | |
| *C08G 18/32* | (2006.01) | |
| *C08G 18/48* | (2006.01) | |
| *C08G 18/58* | (2006.01) | |
| *C08G 18/64* | (2006.01) | |
| *C08G 18/66* | (2006.01) | |
| *C08K 5/5419* | (2006.01) | |
| *C09D 175/04* | (2006.01) | |
| *C08G 18/30* | (2006.01) | |
| *C08G 18/79* | (2006.01) | |
| *C08G 77/04* | (2006.01) | |
| *C08G 18/71* | (2006.01) | |
| *C08G 18/75* | (2006.01) | |
| *C08G 18/16* | (2006.01) | |
| *C08G 18/62* | (2006.01) | |
| *C09D 183/04* | (2006.01) | |
| *C08G 18/10* | (2006.01) | |

(52) U.S. Cl.
CPC ......... *C08G 18/1875* (2013.01); *C08G 18/10* (2013.01); *C08G 18/161* (2013.01); *C08G 18/168* (2013.01); *C08G 18/1816* (2013.01); *C08G 18/1858* (2013.01); *C08G 18/289* (2013.01); *C08G 18/307* (2013.01); *C08G 18/3206* (2013.01); *C08G 18/4825* (2013.01); *C08G 18/58* (2013.01); *C08G 18/6229* (2013.01); *C08G 18/6484* (2013.01); *C08G 18/6607* (2013.01); *C08G 18/718* (2013.01); *C08G 18/758* (2013.01); *C08G 18/792* (2013.01); *C08G 77/04* (2013.01); *C08K 3/013* (2018.01); *C08K 5/5419* (2013.01); *C09D 175/04* (2013.01); *C09D 183/04* (2013.01); *C08K 2201/001* (2013.01)

(58) Field of Classification Search
CPC .............. C08G 18/1875; C08G 18/289; C08G 18/3206; C08G 18/4825; C08G 18/58; C08G 18/6484; C08G 18/6607; C08G 18/161; C08G 18/168; C08G 18/1816; C08G 18/1858; C08G 18/307; C08G 18/6229; C08G 18/718; C08G 18/758; C08G 18/792; C08G 18/10; C08G 77/04; C08K 3/013; C08K 5/5419; C08K 2201/001; C09D 175/04; C09D 183/04
See application file for complete search history.

(56) References Cited

U.S. PATENT DOCUMENTS

| | | |
|---|---|---|
| 8,603,587 B2 | 12/2013 | Poppe et al. |
| 10,093,765 B2 | 10/2018 | Stache et al. |
| 10,093,826 B2 | 10/2018 | Stache et al. |
| 10,125,089 B2 | 11/2018 | Kohlstruk et al. |
| 2009/0326146 A1 | 12/2009 | Sepeur et al. |
| 2010/0092686 A1 | 4/2010 | Laryea et al. |
| 2011/0082254 A1 | 4/2011 | Sepeur et al. |
| 2012/0029143 A1 | 2/2012 | Sepeur et al. |
| 2013/0244043 A1 | 9/2013 | Lomoelder et al. |
| 2015/0166719 A1 | 6/2015 | Huang et al. |
| 2015/0166859 A1* | 6/2015 | Choffat ................ C08G 65/336 524/315 |
| 2015/0191625 A1* | 7/2015 | Lomoelder .......... C08G 18/778 524/91 |
| 2016/0108280 A1 | 4/2016 | Hallack et al. |

(Continued)

FOREIGN PATENT DOCUMENTS

| | | |
|---|---|---|
| DE | 10 2007 013 262 A1 | 9/2008 |
| DE | 10 2007 020404 A1 | 10/2008 |

(Continued)

OTHER PUBLICATIONS

European Search Report dated Oct. 24, 2018 in EP 19174361.6 (2 pages).
European Search Report dated Feb. 21, 2019 in EP 18193333.4 (8 pages).
Kreczinski et al., U.S. Appl. No. 16/354,349, filed Mar. 15, 2019.
Kreczinski et al., U.S. Appl. No. 16/354,753, filed Mar. 15, 2019.
Kreczinski et al., U.S. Appl. No. 16/356,026, filed Mar. 18, 2019.
Kreczinski et al., U.S. Appl. No. 16/356,081, filed Mar. 18, 2019.

*Primary Examiner* — Rabon A Sergent
(74) *Attorney, Agent, or Firm* — Taylor English Duma LLP; Philip P. McCann

(57) ABSTRACT

The present invention relates to a composition at least comprising A) an adduct of isocyanatosilanes with hydroxy-functional compounds and B) a tin-free catalyst, and also to a coating composition comprising at least the composition and to the use of the coating composition.

18 Claims, No Drawings

(56) References Cited

U.S. PATENT DOCUMENTS

| | | |
|---|---|---|
| 2016/0289251 A1* | 10/2016 | Blume ................ C08K 5/548 |
| 2017/0298003 A1 | 10/2017 | Rittsteiger et al. |
| 2017/0369627 A1 | 12/2017 | Stache et al. |
| 2017/0369631 A1 | 12/2017 | Stache et al. |
| 2018/0079855 A1 | 3/2018 | Matner et al. |
| 2018/0086875 A1 | 3/2018 | Achten et al. |
| 2018/0134835 A1 | 5/2018 | Laas et al. |
| 2018/0142056 A1 | 5/2018 | Matner et al. |
| 2018/0155515 A1 | 6/2018 | Spyrou et al. |
| 2018/0327538 A1 | 11/2018 | Lomölder et al. |
| 2018/0355091 A1 | 12/2018 | Laas et al. |
| 2019/0144596 A1 | 5/2019 | Klimmasch et al. |
| 2019/0144597 A1 | 5/2019 | Achten et al. |
| 2019/0144598 A1 | 5/2019 | Klimmasch et al. |

FOREIGN PATENT DOCUMENTS

| | | |
|---|---|---|
| DE | 10 2013 208356 A1 | 11/2014 |
| EP | 3 067 375 A1 | 9/2016 |
| EP | 3 085 718 A1 | 10/2016 |
| WO | 2014/180623 A1 | 11/2014 |

OTHER PUBLICATIONS

Spyrou et al., U.S. Appl. No. 16/408,725, filed May 10, 2019.
Spyrou et al., U.S. Appl. No. 16/408,794, filed May 10, 2019.
Spyrou et al., U.S. Appl. No. 16/408,895, filed May 10, 2019.
Spyrou et al., U.S. Appl. No. 16/409,907, filed May 13, 2019.

\* cited by examiner

TIN-FREE CATALYSIS OF SILANE-FUNCTIONAL POLYURETHANE CROSSLINKERS

CROSS REFERENCE TO RELATED APPLICATIONS

This application is a 35 U.S.C. § 119 patent application which claims the benefit of European Application No. 18193333.4 filed Sep. 10, 2018, which is incorporated herein by reference in its entirety.

FIELD

The present invention relates to an aminosilane-free composition at least comprising A) an adduct of isocyanatosilanes with hydroxy-functional compounds and B) a tin-free catalyst, and also to an aminosilane-free coating composition comprising at least the composition and to the use of the coating composition.

BACKGROUND

For the permanently protective coating of substrates, it is nowadays common to use 2-component coating materials based on polyurethane which are able to cure slowly at ambient temperature and rapidly at elevated temperatures. They typically consist of coating resins and crosslinkers which are in each case equipped with functional groups and react with each other to effect crosslinking. Owing to the high dependence on temperature and crosslinking rate and the necessity resulting therefrom to use active catalysts of toxicological concern and also functional groups, there is a demand to provide alternative coating systems. In this context, high reactivity under various curing conditions and high resistance of the cured coatings to chemicals or weathering effects, but also to mechanical stress, should be ensured. The technical reference recruited comprises the long-known aliphatic 2K-polyurethane systems (PUR).

DE 10 2007 013 262 A1, for example, describes a 2K system of this kind. The 2K systems in question here, however, are systems which can be cured rapidly only at elevated temperatures from 140° C.

WO 2014/180623 A1 describes a silane-containing coating composition which can be cured exclusively at temperatures in the range of 0° C. to 40° C. and, due to the aminosilane used, has no compatibility with 2K polyurethane systems. Furthermore, it is not possible to store customary lacquer rapid-drying solvents such as acetates for example, especially butyl acetate, in combination with the aminosilane-containing coating composition together as a 1K system, since the reactivity of the system is inhibited by the occurrence of aminolysis.

In addition, rapid crosslinking rates can be ensured with the coating compositions disclosed therein only due to the methanol-releasing short-chain alkoxy groups present.

The systems known from the prior art have the disadvantage that these cure either at room temperature or at elevated temperatures and often comprise tin compounds of toxicological concern in order to ensure an adequate crosslinking rate. Furthermore, in the case of silane-containing coating compositions, the mechanical flexibility is often not advantageous and reduction of the intrinsic silane brittleness by, for example, 2K polyurethane systems (PUR) is not possible due to incompatibilities. In addition, in such silane-containing coating compositions, there is the necessity to use methanol-releasing components of toxicological concern in order to ensure an adequate crosslinking rate.

SUMMARY

The object of the present invention is the provision of a composition which can be cured preferably at temperatures in the range of 0° C. to 170° C., is compatible with 2K polyurethane systems and is tin-free. The stated object is achieved by the aminosilane-free compositions according to the invention and the aminosilane-free coating compositions according to the invention of the present invention.

The underlying object of the present invention could be achieved by an aminosilane-free composition at least comprising A) an adduct of isocyanatosilanes with hydroxy-functional compounds and B) a tin-free catalyst. In a preferred embodiment, the aminosilane-free composition consists exclusively of A) an adduct of isocyanatosilanes with hydroxy-functional compounds and B) a tin-free catalyst.

DETAILED DESCRIPTION

The aminosilane-free compositions according to the invention can be used in particular as coating compositions. Surprisingly, it has been shown that the compositions according to the invention, comprising at least the aforementioned components A) and B), already result in stable coatings at 0° C. when they are used as coating compositions. These coating compositions according to the invention are one-component (1K) systems which are simple to apply. Because of the low-molecular weight components of the aminosilane-free composition and aminosilane-free coating compositions, these can be formulated and processed without additional organic solvents for subsequent use. It is therefore possible to realize a VOC content of below 100 g/l.

Furthermore, it has been shown that, surprisingly, the aminosilane-free compositions according to the invention comprising the aforementioned components A) and B) can also rapidly cure ethoxy-based adducts of isocyanatosilanes with hydroxy-functional compounds at room temperature.

Component A) of the aminosilane-free composition or coating composition according to the invention is in the form of adducts of isocyanatosilanes with hydroxy-functional compounds.

The isocyanatosilane is preferably a compound of the formula (I)

OCN-(alkyl)-Si(alkoxy)$_3$ (I)

wherein the alkyl in formula (I) above corresponds to a linear or branched alkyl group having 1 to 4 carbon atoms and the alkoxy in formula (I) above simultaneously or mutually independently corresponds to a methoxy, ethoxy, propoxy or butoxy group, wherein the three alkoxy groups in the compound of the formula (I) may in each case be identical or different from one another.

Suitable compounds of the formula (I) OCN-(alkyl)-Si(alkoxy)$_3$ are in principle all of the possible compounds described above. However, alkoxy is particularly preferably selected from methoxy and ethoxy groups. The alkoxy groups are preferred in the case that all three alkoxy groups are identical, but not methoxy groups.

Suitable compounds of the formula (I) are particularly isocyanatoalkylalkoxysilanes selected from the group comprising 3-isocyanatopropyltrimethoxysilane, 3-isocyanatopropyltriethoxysilane, 3-isocyanatopropyltriisopropoxysilane, 2-isocyanatoethyltrimethoxysilane, 2-isocyanatoethyltriethoxysilane, 2-isocyanatoethyltriisopropoxysilane, 4-isocyanatobutyltrimethoxysilane, 4-isocyanatobutyltriethoxysilane, 4-isocyanatobutyltriisopropoxysilanes, isocyanatomethyltrimethoxysilane, isocyanatomethyltriethoxysilane, isocyanatomethytriisopropoxysilane, 3-isocyanatopropyldimethoxyethoxysilane and/or 3-isocyanatopropyldiethoxymethoxysilane.

As compound of the formula (I) (component A)) in the compositions or coating compositions according to the invention, preference is given to using 3-isocyanatopropyltrimethoxysilane, 3-isocyanatopropyltriethoxysilane, 3-isocyanatopropyldimethoxyethoxysilane and/or 3-isocyanatopropyldiethoxymethoxysilane, particular preference being given to 3-isocyanatopropyltriethoxysilane, 3-isocyanatopropyldimethoxyethoxysilane and/or 3-isocyanatopropyldiethoxymethoxysilane.

The aforementioned isocyanatosilanes take the form of a bound adduct with hydroxy-functional compounds. Suitable such hydroxy-functional compounds include monohydric or polyhydric alcohols and also polyols.

Suitable hydroxy-functional compounds are, for example, monoalcohols or polyols, i.e. diols, triols, tetrols and hydroxyl group-containing polymers. In a preferred embodiment, the hydroxy-functional compounds used are diols, triols or tetrols, particularly preferably diols or triols.

In the case of the monoalcohols, these are, in particular, monofunctional branched or linear alcohols or mixtures thereof having 1 to 20 carbon atoms, preferably 1 to 12 carbon atoms, particularly preferably 1 to 9 carbon atoms, especially methanol, ethanol and propanol and butanol.

Glycol ethers can also be used as monoalcohols. Suitable as glycol ethers are, in particular, ethylene glycol monoethyl ether, ethylene glycol monopropyl ether, ethylene glycol monoisopropyl ether, ethylene glycol monobutyl ether, ethylene glycol monophenyl ether, ethylene glycol dimethyl ether, diethylene glycol monomethyl ether, diethylene glycol monoethyl ether, diethylene glycol monobutyl ether, diethylene glycol dimethyl ether, 1,1'-oxybis(2-triethylene glycol) monomethyl ether, triethylene glycol monobutyl ether, propylene glycol 1-methyl ether, propylene glycol 2-methyl ether, propylene glycol 1-ethyl ether and propylene glycol 1-butyl ether.

Particularly suitable diols are difunctional branched or linear alcohols or mixtures thereof having 1 to 20 carbon atoms, preferably 1 to 12 carbon atoms, particularly preferably 1 to 10 carbon atoms.

Particularly suitable triols are trifunctional branched or linear alcohols or mixtures thereof having 1 to 20 carbon atoms, preferably 1 to 12 carbon atoms, particularly preferably 1 to 10 carbon atoms.

Particularly suitable tetrols are tetrafunctional branched or linear alcohols or mixtures thereof having 1 to 20 carbon atoms, preferably 1 to 12 carbon atoms, particularly preferably 1 to 10 carbon atoms.

Furthermore, it is possible to use hydroxyl group-containing polymers having an OH number of 10 to 500 mg KOH/gram and a number-average molar mass of 250 to 6000 g/mol as hydroxy-functional compounds, wherein the hydroxyl group-containing polymers are selected from polymers of the group consisting of polyesters, polyethers, polyacrylates, polycarbonates, epoxy resins, cellulose derivatives, FEVE (fluoroethylene vinyl ether), alkyds and polyurethanes, wherein the polyurethanes consist of or are formed from polyols and diisocyanate monomers. Preference is given to using hydroxyl group-containing polyesters and/or polyacrylates having an OH number of 20 to 150 mg KOH/gram and a number-average molecular weight of 500 to 6000 g/mol.

The hydroxyl number (OHN) is determined in accordance with DIN EN ISO 4629-2 (2016-12). In this method, the sample is reacted with acetic anhydride in N-methyl-2-pyrrolidone (NMP) in the presence of 4-N-dimethylaminopyridine in NMP as catalyst, wherein the hydroxyl groups are acetylated. This forms one molecule of acetic acid per hydroxyl group while the subsequent hydrolysis of the excess acetic anhydride yields two molecules of acetic acid. The consumption of acetic acid is determined by titrimetry from the difference between the main value and a blank value, which is to be carried out in parallel.

The number-average molecular weights are determined in accordance with DIN 55672-1 (2016-03) using gel permeation chromatography in tetrahydrofuran as eluent with polystyrene for calibration.

Furthermore, mixtures of the abovementioned hydroxy-functional compounds may also be used.

In a preferred embodiment, the hydroxy-functional compounds used for the adduct A) are diols, triols or tetrols, particularly preferably diols or triols.

The preparation of the adducts A) can be carried out solvent-free or using non-protic solvents, and the reaction may take place batchwise or continuously. The reaction may be carried out at room temperature, in other words at temperatures in the range from 20 to 25° C., though preferably higher temperatures are used, in the range from 30 to 150° C., more particularly in the range from 50 to 100° C. To accelerate the reaction it is possible with advantage to use catalysts which are known within urethane chemistry, such as Sn, Bi, Zn and other metal carboxylates, tertiary amines such as, for example, 1,4-diazabicyclo[2.2.2]octane (DABCO), triethylamine, etc. The reaction is preferably carried out in the absence of water.

The reaction of the isocyanatosilanes and of the hydroxy-functional compounds to form the adducts A) takes place here in particular such that the ratio of OH groups of the hydroxy-functional compounds to NCO groups of the isocyanatosilanes in the adduct A) is from 0.8:1 to 1.2:1, preferably from 0.9:1 to 1.1:1, with stoichiometric reaction (1:1) being especially preferred. In an especially preferred embodiment, complete conversion of all OH groups of the hydroxy-functional compounds with NCO groups of the isocyanatosilanes is achieved, especially those of the compounds of the formula (I).

Depending on the selected stoichiometry of the two reactants, the adduct A) obtained may still contain free hydroxyl or isocyanate groups. However, the adducts A) are preferably free of NCO groups. In this context, the phrase "free of NCO groups" is understood to mean that the composition according to the invention or the coating composition according to the invention comprises ≤0.5% free NCO groups, preferably ≤0.05% free NCO groups, more preferably ≤0.01% free NCO groups and particularly preferably no free NCO groups. The percentage refers to the total amount of NCO groups of the isocyanatosilane used.

In the reaction specified, the NCO groups of the isocyanatosilanes react with the OH groups of the hydroxy-functional compounds to form NH—CO—O groups, which link the specified compounds to each other. The adducts A) thereby obtained are particularly liquid at temperatures at and above 0° C., even in solvent-free form. They are therefore preferably non-crystallizing compounds of low molecular mass.

The adducts A) in solvent-free form are low- to highly viscous, i.e. they have a viscosity in the range of 10 to 40 000 mPa·s, preferably in the range of 50 to 18 000 mPa·s (DIN EN/ISO 3219 (1994-10) at 23° C.). For greater ease of handling, the products may also additionally have had solvents added to them which, like alcohols, may also be protic. The solids contents of such preparations are preferably >80% by weight, the maximum viscosity being preferably 1000 mPas (DIN EN/ISO 3219 (1994-10) at 23° C.).

The amount of component A) in the aminosilane-free composition according to the invention or in the aminosilane-free coating composition according to the invention is preferably 40 to 99% by weight based on the total composition or the total coating composition.

The component B) of the aminosilane-free composition according to the invention or of the aminosilane-free coating composition according to the invention is a tin-free catalyst. Thus, the aminosilane-free composition according to the invention or the aminosilane-free coating composition according to the invention is preferably totally additionally tin-free. In the context of the present invention, tin-free is understood to mean that no tin compound (for example as catalyst) is added to the aminosilane-free composition according to the invention or to the aminosilane-free coating composition according to the invention, but tin compounds may be introduced in minute amounts as impurity from the previous preparation process of the components in the coating composition.

The tin-free catalyst B) may be selected particularly from the group consisting of nitrogen-containing catalysts, salts and esters of oxoacids of phosphorus and alkylammonium halides, although mixtures of compounds of the groups specified are also possible. In a preferred embodiment, alkylammonium halides or mixtures of various alkylammonium halides are used as catalyst in the compositions according to the invention or coating compositions according to the invention.

Nitrogen-containing catalysts which may be used in the compositions according to the invention or coating compositions according to the invention are particularly amidines and guanidines. The amidines are preferably bicyclic amidines or mixtures of bicyclic amidines. The bicyclic amidines that can be used are particularly diazabicyclononene (DBN) or diazabicycloundecene (DBU). With respect to the guanidines, preference is given to tetramethylguanidine (TMG).

The salts and esters of oxoacids of phosphorus that can be used as catalyst are preferably selected from the group consisting of mono- or diesters of phosphoric acid, diphosphonic acid diesters and mixtures thereof. Preferred salts and esters of oxoacids of phosphorus are mono- or diesters of phosphoric acid and diphosphonic diesters, with mono- or diesters of phosphoric acid being particularly preferred.

The mono- or diesters of phosphoric acid are particularly mono- or dialkyl esters of phosphoric acid (so-called alkyl or dialkyl phosphates). The alkyl groups of the alkyl or dialkyl phosphates preferably have 1 to 8 carbon atoms, for example methyl, ethyl, propyl, butyl, hexyl, heptyl or octyl, particularly preferably the dialkyl phosphates have 2 to 5 carbon atoms. The alkyl groups of the dialkyl phosphates may in this case be identical or different from each other, preferably they are identical. The mono- or dialkyl esters of phosphoric acid are especially preferably a phosphoric acid butyl ester, for example available under the names Hordaphos® MDB or Hordaphos® MOB from Clariant.

The diphosphonic acid diesters are especially dialkyl diphosphonates. The alkyl groups of the dialkyl diphosphonates preferably have 1 to 8 carbon atoms, for example methyl, ethyl, propyl, butyl, hexyl, heptyl or octyl, particularly preferably the dialkyl diphosphonates have 2 to 5 carbon atoms. The alkyl groups of the dialkyl diphosphonates may in this case be identical or different from each other, preferably they are identical.

The catalysts used may also be alkylammonium halides or mixtures of different alkylammonium halides. The alkyl groups in this case may have 1 to 6 carbon atoms. Preferred alkylammonium halides are alkylammonium fluorides, particularly preferably quaternary alkylammonium fluorides, wherein the alkyl groups in this case may have 1 to 6 carbon atoms. The especially preferred alkylammonium fluorides used can be tetramethylammonium fluoride (TMAF), tetraethylammonium fluoride (TEAF), tetrapropylammonium fluoride (TPAF) and tetrabutylammonium fluoride (TBAF). The alkylammonium fluorides specified are preferably used in the form of their hydrates, for example the trihydrate. The alkylammonium halides can be added to the composition in particular as a solution in a C1 to C6-alcohol, especially methanol, ethanol, propanol, butanol, pentanol or hexanol.

The amount of tin-free catalyst B) in the aminosilane-free composition according to the invention or in the aminosilane-free coating composition according to the invention is particularly 0.01 to 3.0% by weight, preferably 0.1 to 1% by weight, based in each case on the total composition or the total coating composition.

The present invention relates to aminosilane-free compositions or aminosilane-free coating compositions. In the context of the present invention, aminosilane-free is understood to mean that no aminosilane is added to the composition or the coating composition and these compositions or coating compositions do not comprise any aminosilane. Minute amounts (<0.01% by weight) of aminosilanes, which for example are introduced from impurities of the components, can be tolerated.

This can achieve the result that the compositions or coating compositions according to the invention can be combined with polyisocyanates or 2K polyurethane systems since no reaction between polyisocyanate and aminosilane can take place. Furthermore, the composition according to the invention or the coating composition according to the invention without aminosilane is stable to baking. Monomeric aminosilanes already boil at comparatively low temperatures and are then no longer sufficiently available for activation of the coating system. Methanol may also be released due to aminosilanes in the compositions or coating compositions, which may be undesirable for certain applications from a toxicological viewpoint, for example for over-the-counter products of the construction market.

The aminosilane-free composition according to the invention, as mentioned, can consist of the components A) and B), be free of binders and be used as coating compositions. The aminosilane-free coating composition is then a one-component (1K) coating composition consisting of the composition according to the invention.

Accordingly, the invention relates to an aminosilane-free 1K coating composition comprising at least the composition according to the invention (at least comprising the, or consisting of, the components A) and B)) but no binder. In a preferred embodiment, the aminosilane-free 1K coating composition additionally comprises at least one auxiliary and/or additive and/or at least one solvent.

The solvent is preferably an organic solvent, for example ketones, esters, alcohols or aromatic systems. The solvent can be included in the aminosilane-free 1K coating composition according to the invention preferably in amounts of 1 up to 50% by weight, particularly 5 to 75% by weight, based in each case on the total coating composition. The amount of the solvents is guided by the application viscosity to be set for the coating composition.

The aminosilane-free 1K coating composition may comprise auxiliaries and/or additives such as stabilizers, light stabilizers, pigments, fillers, levelling agents or rheological assistants, such as "sag control agents", microgels or fumed silicon dioxide, but in typical concentrations. In the case of pigment-free coating compositions, the auxiliaries and/or additives can be included in the aminosilane-free coating composition according to the invention preferably in amounts of 0.01 up to 90% by weight, particularly 0.1 to 20% by weight, based in each case on the total coating composition. In the case of pigment- and/or filler-containing coating compositions, the content of auxiliaries and/or additives may be 0.01 to 99% by weight, particularly 0.1 to 90% by weight, based in each case on the total coating composition.

However, the coating composition according to the invention may also comprise binder components. This results in a two-component, aminosilane-free (2K) coating composition. The two components (in the present case the aminosilane-free composition of at least A) and B) as one component and the binder as the other component) are stored separately from each other and are only mixed together during application since the binder can only be stable on storage with the aminosilane-free composition of at least the components A) and B) in exceptional cases.

Accordingly, the invention also relates to an aminosilane-free 2K coating composition comprising at least the composition according to the invention (at least comprising the, or consisting of, the components A) and B)) and at least one binder component. In a preferred embodiment, the aminosilane-free 2K coating composition additionally comprises at least one auxiliary and/or additive and/or at least one solvent.

Suitable in principle as binder components are all kinds of binders known to the person skilled in the art, including, for example, binders which are also thermoplastic, in other words not crosslinkable, which customarily have an average molecular weight >10 000 g/mol. However, preference is given to using binders comprising reactive functional groups having acidic hydrogen atoms. Suitable binders of the type mentioned have for example at least one, but preferably two or more, hydroxyl group(s). Further suitable functional groups of the binder are trialkoxysilane functionalities, for example.

Binders with functional groups that are used are preferably hydroxyl group-containing polymers, particularly hydroxyl group-containing polyesters, polyethers, polyacrylates, polycarbonates and polyurethanes having an OH number of 20 to 500 mg KOH/g and an average molar mass of 250 to 6000 g/mol. Particular preference in the context of the present invention is given to using hydroxyl-containing polyesters or polyacrylates having an OH number of 20 to 150 mg KOH/g and an average molecular weight of 500 to 6000 g/mol as binder components.

(Meth)acrylic copolymers containing hydroxyl groups that may be used include resins having a monomer composition as described, for example, in DE 195 29124 C1. The acid number of the (meth)acrylic copolymer, which can be adjusted by using a proportion of (meth)acrylic acid as monomer, should be 0 to 30, preferably 3 to 15, mg KOH/g. The number-average molar weight (determined by gel permeation chromatography against a polystyrene standard) of the (meth)acrylic copolymer is preferably 2000 to 20 000 g/mol; the glass transition temperature is preferably −40° C. to +60° C. The hydroxyl content of the (meth)acrylic copolymers for use in accordance with the invention to be established by employing a proportion of hydroxyalkyl (meth)acrylates is preferably 20 to 250 mg KOH/g, particularly preferably 90 to 190 mg KOH/g.

Polyester polyols suitable in accordance with the invention are resins having a monomer composition composed of dicarboxylic and polycarboxylic acids and of diols and polyols, as described, for example, in WO 93/15849 A1. Polyester polyols used may also be polyaddition products of caprolactone with low molecular mass diols and triols, of the kind available, for example, under the name CAPA® (Perstorp). The arithmetically determined number-average molar mass is preferably 500 to 5000 g/mol, more preferably 800 to 3000 g/mol; the average functionality is preferably 2.0 to 4.0, preferably 2.0 to 3.5.

Also used in principle as polyols for use in accordance with the invention and comprising urethane and ester groups are those described in EP 0 140 186 A2. Preference is given to using urethane- and ester-group-containing polyols prepared using HDI, IPDI, trimethylhexamethylene diisocyanate (TMDI) or ($H_{12}$-MDI). The number-average molar mass is preferably 500 to 2000 g/mol; the average functionality is especially in the range of 2.0 to 3.5.

It is of course also possible to use mixtures of the above-described binders. Preferred binders are hydroxyl group-containing polyesters and polyacrylates, alone or in mixtures.

The proportion of any additional binders in the aminosilane-free 2K coating composition according to the invention can be especially 5 to 60% by weight, more particularly 10 to 40% by weight, based on the total coating composition.

The aminosilane-free 2K coating composition according to the invention may further comprise auxiliaries and/or additives that are known within coatings technology, such as stabilizers, light stabilizers, pigments, fillers, levelling agents or rheological assistants, such as so-called "sag control agents" for example, microgels or fumed silicon dioxide, in typical concentrations. If necessary, organic or inorganic color pigments and/or effect pigments that are customary within coatings technology may also be incorporated in the aminosilane-free coating composition according to the invention.

In the case of pigment-free, aminosilane-free coating compositions, the auxiliaries and/or additives can be included in the aminosilane-free coating composition according to the invention preferably in amounts of 0.01 to 90% by weight, particularly 0.1 to 20% by weight, based in each case on the total coating composition. In the case of pigment- and/or filler-containing aminosilane-free coating compositions, the content of auxiliaries and/or additives may be 0.01 to 99% by weight, particularly 0.1 to 90% by weight, based in each case on the total coating composition.

The solvent optionally present for the aminosilane-free 2K coating composition is preferably an organic solvent, for example ketones, esters, alcohols or aromatic systems. The solvent can be included in the coating composition according to the invention preferably in amounts of 1 to 50% by weight, particularly 5 to 75% by weight, based in each case on the total coating composition. The amount of the solvents is guided by the application viscosity to be set for the coating material.

The sum total of the fractions of all components of the aminosilane-free composition or of the aminosilane-free coating composition, i.e. at least of the components A) and B), and also of the additionally possible binders, auxiliaries and/or additives, and solvents, always adds up to 100% by weight.

The aminosilane-free composition according to the invention and the aminosilane-free coating composition according to the invention are produced by mixing of the components described above. The mixing may be accomplished in mixers known to the person skilled in the art, examples being stirring vessels, dissolvers, bead mills, roll mills, etc., or else continuously by means of static mixers.

The invention further relates to the use of aminosilane-free 1K or 2K coating compositions comprising at least the aminosilane-free composition according to the invention, wherein the coating compositions can be cured particularly at temperatures of 0° C. to 170° C. and are suitable for coating wood, plastic, glass or metal.

The coatings obtained on the basis of the above-stated coating compositions are characterized by high resistance to mechanical stress. In addition, they exhibit very good resistance to chemicals, extremely good weathering resistance, and a very good balance between hardness and flexibility.

Coatings comprising the coating compositions according to the invention are a further subject of the present invention.

Even without further elaboration it is assumed that a person skilled in the art will be able to utilize the description above to the greatest possible extent. The preferred embodiments and examples are therefore to be interpreted merely as a descriptive disclosure which is by no means limiting in any way whatsoever.

The present invention is more particularly elucidated hereinbelow with reference to examples. Alternative embodiments of the present invention are obtainable analogously.

EXAMPLES

Example 1

Production of Coating Compositions (1K)

The individual substances, depending on the formula, are placed in succession in a glass bottle and stirred until a homogenous and thoroughly mixed solution is formed. Prior to addition to the composition, the alkylammonium halides TMAF and TBAF used were dissolved to give a 10% solution in ethanol (except in Example 2/composition N). A levelling agent (Tego Glide 410/10% in n-butyl acetate) was added to all coating compositions.

Production of the Coatings

The compositions produced as described above are applied to test panels (Chemetall Group/Gardobond 26S 60 OC) using a coating bar having a wet film thickness of about 120 μm. An overview of the compositions produced are found in Table 1. All amounts are stated in percent by weight.

After application, the test panels with the coating are stored in a controlled-climate chamber at 23° C. and a relative humidity of 50%. After one day, the pendulum hardness (in accordance with König) of the coatings produced is determined. In addition, the dust-dry time is recorded directly after application of the coating.

The basis for the pendulum hardness is that the greater the damping effect of the substrate and the absorption of swing energy, the more quickly the amplitude of swaying of the self-supporting pendulum is reduced. The sample plate (with coating) is placed on the reciprocating platen. With the lever arm, which can be operated from the outside, the reciprocating platen is subsequently moved up to the pendulum. The pendulum is deflected to the 6° scale position, fixed to the wire trigger, and then let go. A determination is made of the number of swings needed to cause the pendulum swing to subside from 6° to 3° relative to the vertical. Multiplying the swings by a factor of 1.4 gives the calculated König pendulum damping in seconds. The measurement is conducted at 2 different positions within the sample and the mean is calculated.

The drying time of the coating material is determined by determination of the dust-dry time in accordance with EN ISO 9177 (3:2010).

For this purpose, the coating substrate is coated with the coating to be tested at the target film thickness. The time point is noted. At intervals of 10 minutes, ca. 0.3 to 0.5 g of heavy glass beads (glass beads Ø: 250-500 μm/manufacturer: Carl-Roth GmbH+Co. KG) are scattered carefully onto the coating with a small spoon/spatula from a point at a height of 0.5 cm (diameter of the glass bead pile ca. 1.5 to 2.0 cm). Every 10 minutes, a new glass bead-free point is impacted with glass beads. In the case of rapid systems, the time interval is reduced to 5 minutes, while in the case of slow systems they are initially increased to 15 to 30 minutes. Towards the end of the curing time, the time intervals are then shortened again to 10 minutes. At each point, the time interval since application of the coating is noted. If the coating is optically dried, the glass beads are wiped from the panel using a soft hair brush and the time recorded at the time point at which no glass beads adhere to the film surface. If glass beads adhere to the film surface, the test is continued.

The results obtained for the coatings produced are presented in Table 2.

TABLE 1

Overview of the compositions produced of Example 1)

|  | A* | B* | C* | D | E | F | G | H | I | J |
|---|---|---|---|---|---|---|---|---|---|---|
| VESTANAT EP-M 60 (1) | 89.41 |  |  | 98.50 | 98.50 | 98.50 | 98.50 | 98.50 | 99.00 |  |
| VESTANAT EP-E 95 (2) |  | 89.41 | 78.50 |  |  |  |  |  |  | 94.50 |
| Dynasylan AMMO (3) | 10.00 | 10.00 | 20.00 |  |  |  |  |  |  |  |
| TIB Kat 218 (4) | 0.09 | 0.09 | 1.0 |  |  |  |  |  |  |  |
| Tego Glide 410 (5) | 0.05 | 0.05 | 0.05 | 0.05 | 0.05 | 0.05 | 0.05 | 0.05 | 0.05 | 0.05 |
| Hordaphos MOB (6) |  |  |  | 1.00 |  |  |  |  |  |  |
| Hordaphos MDB (7) |  |  |  |  | 1.00 |  |  |  |  |  |
| Poly cat 102 (8) |  |  |  |  |  | 1.00 |  |  |  |  |
| TMG (9) |  |  |  |  |  |  | 1.00 |  |  |  |

TABLE 1-continued

Overview of the compositions produced of Example 1)

|  | A* | B* | C* | D | E | F | G | H | I | J |
|---|---|---|---|---|---|---|---|---|---|---|
| K-KAT XK-678 (10) |  |  |  |  |  |  |  | 1.00 |  |  |
| TMAF (11) |  |  |  |  |  |  |  |  | 0.05 |  |
| TBAF*3H$_2$O (12) |  |  |  |  |  |  |  |  |  | 0.50 |
| Ethanol |  |  |  |  |  |  |  |  | 0.45 | 4.50 |
| n-Butyl acetate | 0.45 | 0.45 | 0.45 | 0.45 | 0.45 | 0.45 | 0.45 | 0.45 | 0.45 | 0.45 |

The compositions marked with * are comparative examples
(1) VESTANAT EP-M 60, adduct of 3-isocyanatopropyltrimethoxysilane and 1,6-hexanediol (ratio of 3-isocyanatopropyltrimethoxysilane to 1,6-hexanediol corresponds to 2:1)
(2) VESTANAT EP-E 95, adduct of 3-isocyanatopropyltriethoxysilane and 1,9-nonanediol (ratio of 3-isocyanatopropyltriethoxysilane to 1,9-nonanediol corresponds to 2:1)
(3) Dynasylan AMMO, 3-aminopropyltrimethoxysilane from Evonik Resource Efficiency GmbH
(4) TIB Kat 218, dibutyltin dilaurate, TIB Chemicals AG
(5) Tego Glide 410, polyether siloxane copolymer, Evonik Resource Efficiency GmbH
(6) Hordaphos MOB, phosphoric acid butyl esters, Clariant
(7) Hordaphos MDB, phosphoric acid butyl esters, Clariant
(8) Polycat DBU, diazabicycloundecene, Evonik Resource Efficiency GmbH
(9) Tetramethylguanidine, Merck Millipore
(10) K-KAT XK-678, alkyl acid phosphate, King Industries
(11) Tetramethylammonium fluoride, Sigma Aldrich
(12) Tetrabutylammonium fluoride trihydrate, Sigma Aldrich

TABLE 2

Results of the determination of pendulum hardness and dust-dry time

| Period prior to measurement | A* | B* | C* | D | E | F | G | H | I | J |
|---|---|---|---|---|---|---|---|---|---|---|
|  | Mean pendulum hardness | | | | | | | | | |
| 1 day | 97 | Liquid | 48 | 109 | 102 | 120 | 116 | 109 | 101 | 113 |
|  | Mean dust-dry time (min.) | | | | | | | | | |
|  | 35 | >210 | >210 | 25 | 40 | 15 | 30 | 25 | 5 | 22 |

It is evident from Table 2 that the coating compositions according to the invention comprising the tin-free catalysts (samples D to J) cure comparably rapidly or even more rapidly at room temperature than the comparative examples with tin-containing catalyst and aminosilane (samples A*, B* and C*). The same applies also to the pendulum hardnesses which are almost exclusively higher in the examples according to the invention. All catalysts according to the invention listed are therefore an alternative to the known tin-containing catalysts and also the aminosilane.

Surprisingly, even rapid curing of ethoxy-based adducts (2) could also be achieved at room temperature by using alkylammonium halides (sample J), which was not possible with the known compositions (sample B* and C*).

Example 2

Production of Coating Compositions (2K)

The individual substances, depending on the formula, are placed in succession in a glass bottle and stirred until a homogenous and thoroughly mixed solution is formed. The NCO:OH ratio was adjusted in each case to a ratio of 1:1. The viscosity of the formulations, determined as the flow time in the DIN 4 cup at 23° C., is approximately 20 seconds. Prior to addition to the composition, the alkylammonium halides TMAF and TBAF used were dissolved in ethanol (10% solution of TMAF and TBAF). A levelling agent (Tego Glide 410/10% in n-butyl acetate) was added to all coating compositions.

Production of the Coatings

The compositions produced as described above are applied to test panels (Chemetall Group/Gardobond 26S 60 OC) using a coating bar having a wet film thickness of about 120 µm. An overview of the compositions produced are found in Table 3. All figures are stated in percent by weight.

After application, the test panels are cured with the coating for 30 minutes at 130° C. in an air circulation oven. After one day, the pendulum hardness (in accordance with König) of the coatings produced is determined.

The results obtained for the coatings produced are presented in Table 4.

TABLE 3

Overview of the compositions produced of Example 2)

|  | K* | L | M | N |
|---|---|---|---|---|
| Setalux 1767 VV-65 (1) | 46.64 | 46.39 | 46.39 | 46.39 |
| VESTANAT HT 2500 L (2) | 17.20 | 17.11 | 17.11 | 17.11 |
| VESTANAT EP-M 60 (3) | 8.24 | 9.11 | 9.11 | 9.11 |
| Tego Glide 410 (4) | 0.05 | 0.05 | 0.05 | 0.05 |
| Butyl acetate/xylene (5) | 26.49 | 26.35 | 26.35 | 26.35 |
| Dynasylan AMMO (6) | 0.92 |  |  |  |
| TIP Kat 218 (7) | 0.01 |  |  |  |
| Hordaphos MOB (8) |  | 0.54 |  |  |
| Polycat 102 (9) |  |  | 0.54 |  |

TABLE 3-continued

Overview of the compositions produced of Example 2)

|  | K* | L | M | N |
|---|---|---|---|---|
| TBAF*3H$_2$O (10) |  |  |  | 0.54 |
| n-Butyl acetate | 0.45 | 0.45 | 0.45 | 0.45 |

The composition marked with * is a comparative example.
(1) Setalux 1767 VV-65, polyacrylate polyol, Nuplex Resins B.V.
(2) VESTANAT HT 2500 L, hexamethylene-1,6-diisocyanate, homopolymer (isocyanurate type), 90% in n-butyl acetate/solvent naphtha (1:1), Evonik Resource Efficiency GmbH
(3) VESTANAT EP-M 60, adduct of 3-isocyanatopropyltrimethoxysilane and 1,6-hexanediol (ratio of 3-isocyanatopropyltrimethoxysilane to 1,6-hexanediol corresponds to 2:1)
(4) Tego Glide 410, polyether siloxane copolymer, Evonik Resource Efficiency GmbH
(5) o-Xylene/n-butyl acetate (1:1 mixture), Merck Millipore
(6) Dynasylan AMMO, 3-aminopropyltrimethoxysilane, Evonik Resource Efficiency GmbH
(7) TIP Kat 218, dibutyltin dilaurate, TIB Chemicals AG
(8) Hordaphos MOB, phosphoric acid butyl ester, Clariant
(9) Polycat DBU, diazabicycloundecene, Evonik Resource Efficiency GmbH
(10) Tetrabutylammonium fluoride trihydrate, Sigma Aldrich

TABLE 4

Results of the determination of the
pendulum hardness and dust-dry time

| Period of the | Mean pendulum hardness | | | |
|---|---|---|---|---|
| measurement | K* | L | M | N |
| 1 day | 52 | 128 | 161 | 146 |
|  | Mean dust-dry time (min.) | | | |
|  | K* | L | M | N |
|  | >210 | 60 | 90 | 30 |

It is apparent from Example 2 that the comparative example (sample K*) shows a poor compatibility with 2K PUR compositions which manifests as an inadequate pendulum hardness.

If, however, the catalyst systems according to the invention (samples L to N) are used, sufficient hardnesses can be generated despite increased curing temperatures.

The compositions according to the invention can be cured while retaining the advantageous properties both at room temperature (Example 1) and even at elevated temperatures (Example 2).

The invention claimed is:

1. An aminosilane-free composition comprising
   A) an adduct of an isocyanatosilane with a hydroxy-functional compound wherein the adduct A) comprises <0.05% free NCO groups,
   B) a tin-free catalyst selected from the group consisting of alkylammonium halides, wherein the hydroxy-functional compound is selected from the group consisting of monoalcohols, diols, triols, tetrols and hydroxyl group-containing polymers having an OH number of from 10 to 500 mg KOH/gram and a number-average molar mass of from 250 to 6000 g/mol, and
   C) a polyether siloxane copolymer,
   wherein the hydroxyl group-containing polymers are selected from the group consisting of polyesters, polyethers, polyacrylates, polycarbonates, epoxy resins, FEVE (fluoroethylene vinyl ether), alkyds and polyurethanes, wherein the polyurethanes consist of polyols and diisocyanate monomers; and
   wherein the amount of component A) is from 40 to 99% by weight and the amount of component B) is from 0.01 to 3% by weight, based in each case on the total composition.

2. The aminosilane-free composition according to claim 1, wherein the isocyanatosilane is selected from the group consisting of 3-isocyanatopropyltrimethoxysilane, 3-isocyanatopropyltriethoxysilane, 3-isocyanatopropyldimethoxyethoxysilane and/or 3-isocyanatopropyldiethoxymethoxysilane.

3. The aminosilane-free composition according to claim 2, wherein the ratio of OH groups of the hydroxy-functional compounds to NCO groups of the isocyanatosilanes is from 1 to 1.

4. The aminosilane-free composition according to claim 1, wherein the tin-free catalyst B) is selected from the group consisting of alkylammonium fluorides.

5. The aminosilane-free composition according to claim 1, wherein the tin-free catalyst B) is tetramethylammonium fluoride, tetrapropylammonium fluoride, tetraethylammonium fluoride, tetrabutylammonium fluoride or a mixture thereof.

6. A one-component (1K) coating composition comprising at least the aminosilane-free composition according to claim 1.

7. A one-component coating composition according to claim 6 which comprises at least one auxiliary and/or additive and/or at least one solvent.

8. The one-component coating composition according to claim 7, wherein the at least one auxiliary and/or additive is selected from the group consisting of stabilizers, light stabilizers, pigments, levelling agents or rheological assistants, microgels, fumed silicon dioxide, inorganic or organic color pigments and/or effect pigments or mixtures of two or more thereof.

9. A composite comprising the one-component coating composition according to claim 6 wherein the composite comprises wood, plastic, glass or metal.

10. A coating comprising the one-component coating composition according to claim 6.

11. The aminosilane-free composition according to claim 2, wherein the tin-free catalyst B) is an alkylammonium fluoride.

12. A two-component (2K) coating composition comprising at least the aminosilane-free composition according to claim 1.

13. A two-component coating composition according to claim 12 which comprises at least one auxiliary and/or additive and/or at least one solvent.

14. The two-component coating composition according to claim 13, wherein the at least one auxiliary and/or additive is selected from the group consisting of stabilizers, light stabilizers, levelling agents or rheological assistants, microgels, fumed silicon dioxide, inorganic or organic color pigments and/or effect pigments or mixtures of two or more thereof.

15. A composite comprising the two-component coating composition according to claim 12 wherein the composite comprises wood, plastic, glass or metal.

16. A coating comprising the two-component coating composition according to claim 12.

17. The aminosilane-free composition according to claim 1, wherein the hydroxy-functional compound is selected from the group consisting of a diol, triol and tetrol.

18. The aminosilane-free composition according to claim 1, wherein the hydroxy-functional compound is a diol or a triol.

* * * * *